(12) United States Patent
Nave et al.

(10) Patent No.: US 7,477,478 B2
(45) Date of Patent: Jan. 13, 2009

(54) DEEP STORAGE SLOT WITH A CONSTANT SPRING FORCE

(75) Inventors: Shawn M. Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 11/393,497

(22) Filed: Mar. 30, 2006

(65) Prior Publication Data

US 2007/0230036 A1 Oct. 4, 2007

(51) Int. Cl.
*G11B 15/68* (2006.01)
*B65D 85/672* (2006.01)
(52) U.S. Cl. .................. 360/92.1; 312/9.22; 206/387.12
(58) Field of Classification Search ................ 312/9.22; 206/308.1, 387.1, 387.12, 387.15; 360/92.1
See application file for complete search history.

(56) References Cited

U.S. PATENT DOCUMENTS

| | | | | |
|---|---|---|---|---|
| 2,273,644 A | * | 2/1942 | Hope | .......................... 221/279 |
| 3,899,229 A | * | 8/1975 | Ackeret | ...................... 312/9.57 |
| 4,042,096 A | * | 8/1977 | Smith | ........................ 211/85.18 |
| 4,216,857 A | * | 8/1980 | Huang | ........................... 206/1.5 |
| 4,538,729 A | * | 9/1985 | Ackeret | ......................... 206/307 |
| 4,632,248 A | * | 12/1986 | Hsu | ......................... 206/387.12 |
| 5,011,015 A | * | 4/1991 | Ziegler et al. | ........... 206/387.12 |
| 5,012,922 A | * | 5/1991 | Nehl | ....................... 206/387.12 |
| 5,285,897 A | * | 2/1994 | Ozaki | ..................... 206/387.12 |
| 6,781,789 B2 | | 8/2004 | Ostwald | ........................ 360/92 |

* cited by examiner

*Primary Examiner*—William J Klimowicz
(74) *Attorney, Agent, or Firm*—Cantor Colburn LLP; Kurt Goudy

(57) ABSTRACT

Disclosed is a deep storage slot with a constant spring force comprising a storage slot housing defining a cartridge cavity and a cartridge opening, wherein the cartridge cavity is configured to store a plurality of cartridges in depth. Also disclosed is a constant force spring comprising a rolled, prestressed strip that exerts a constant force to resist uncoiling, the constant force spring having a first end affixed to the storage slot housing within the cartridge cavity to direct the constant force towards the cartridge opening, and at least one retention feature configured with the storage slot housing to hold at least one of the plurality of cartridges within the cartridge cavity against the constant force.

4 Claims, 5 Drawing Sheets

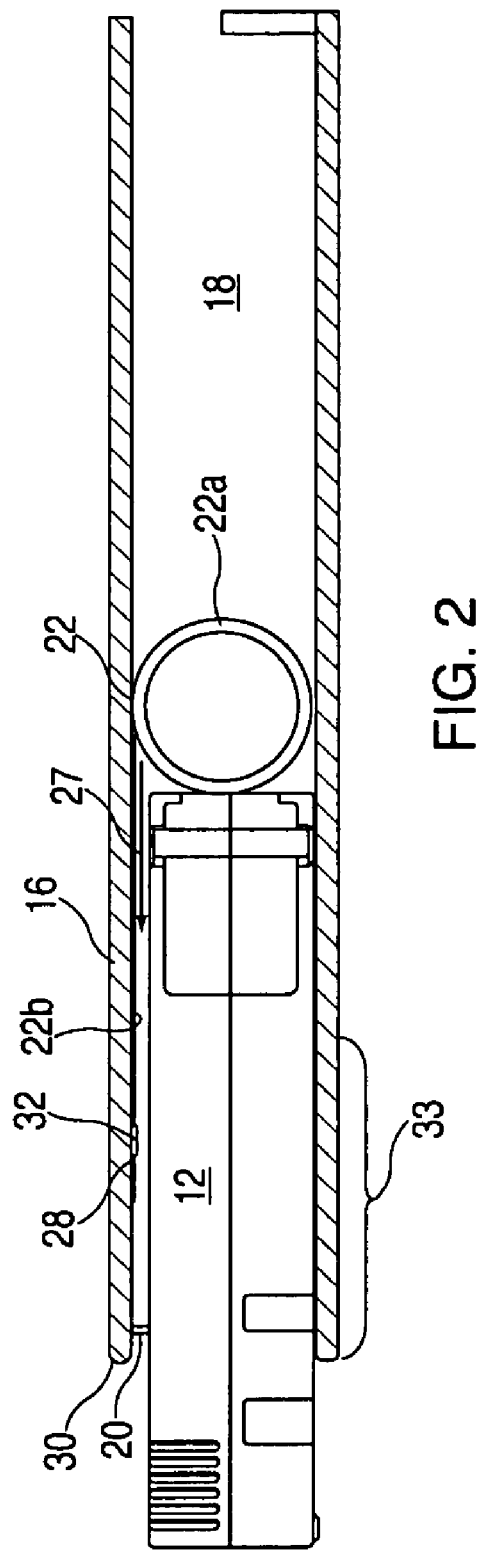
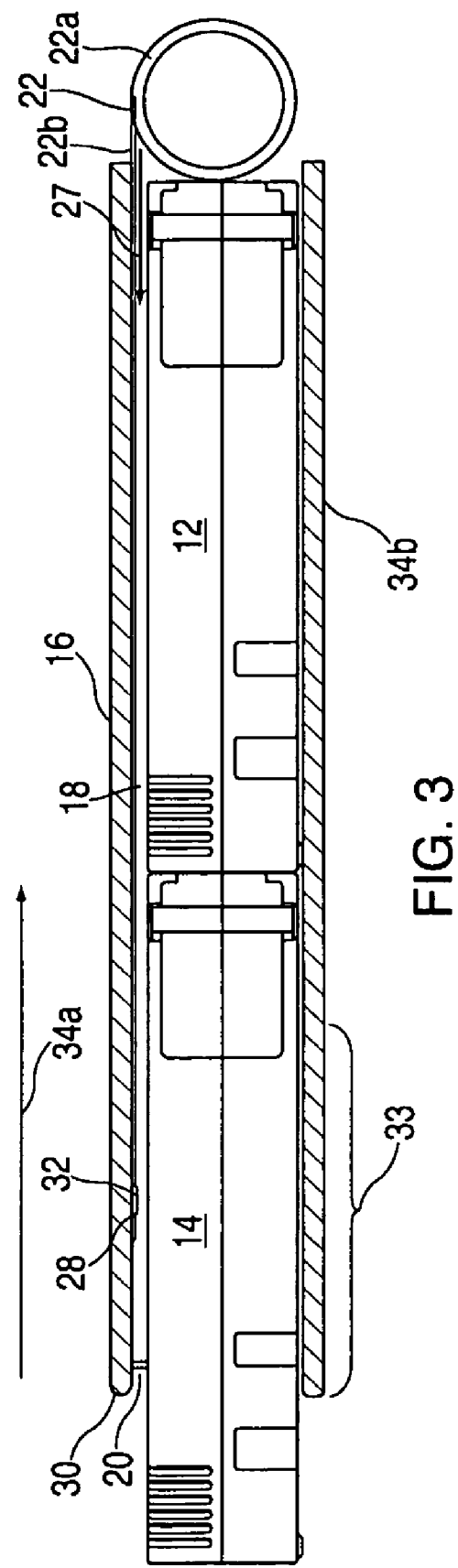

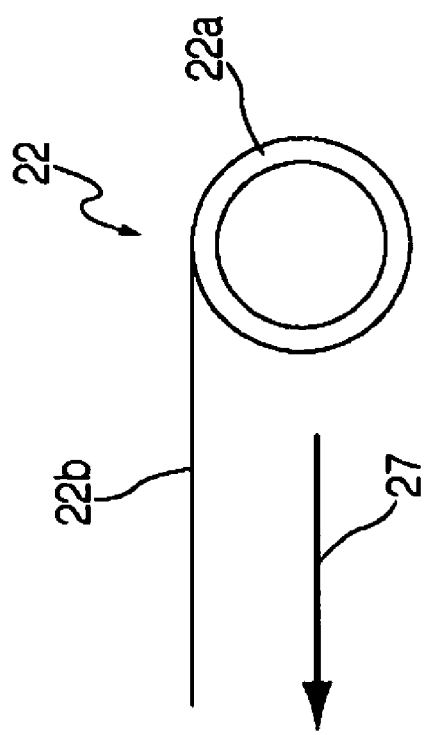
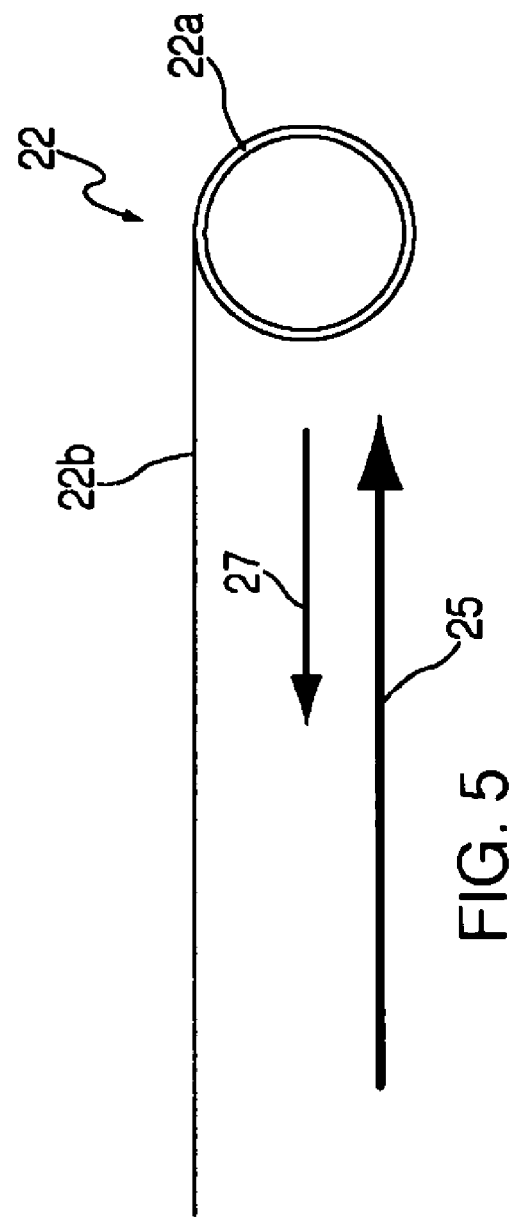
FIG. 4
FIG. 5

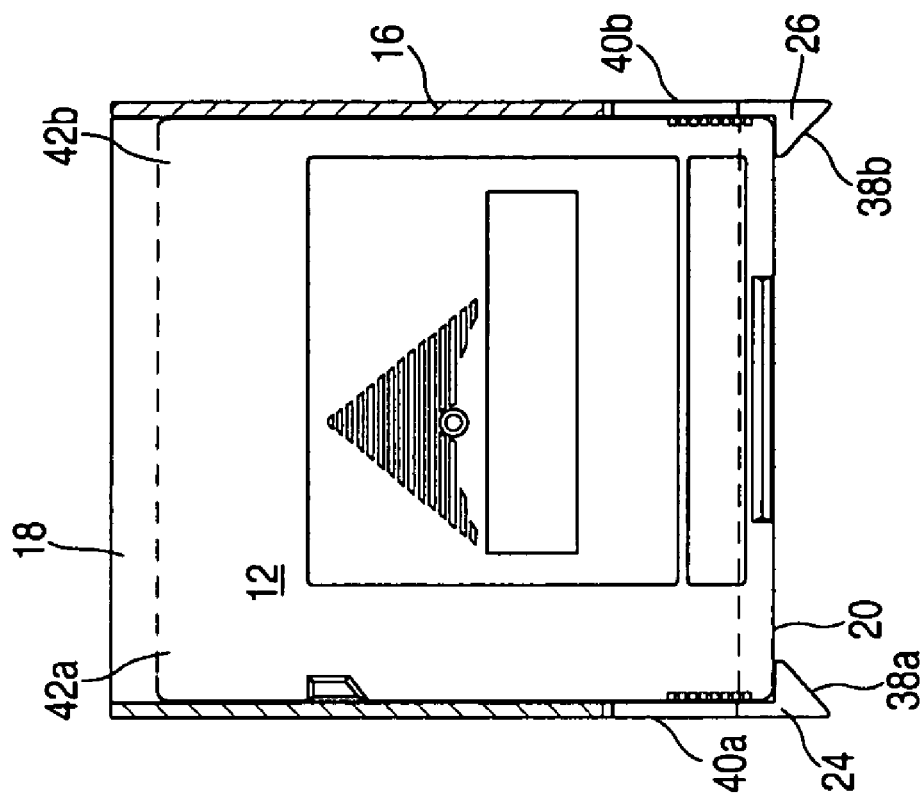
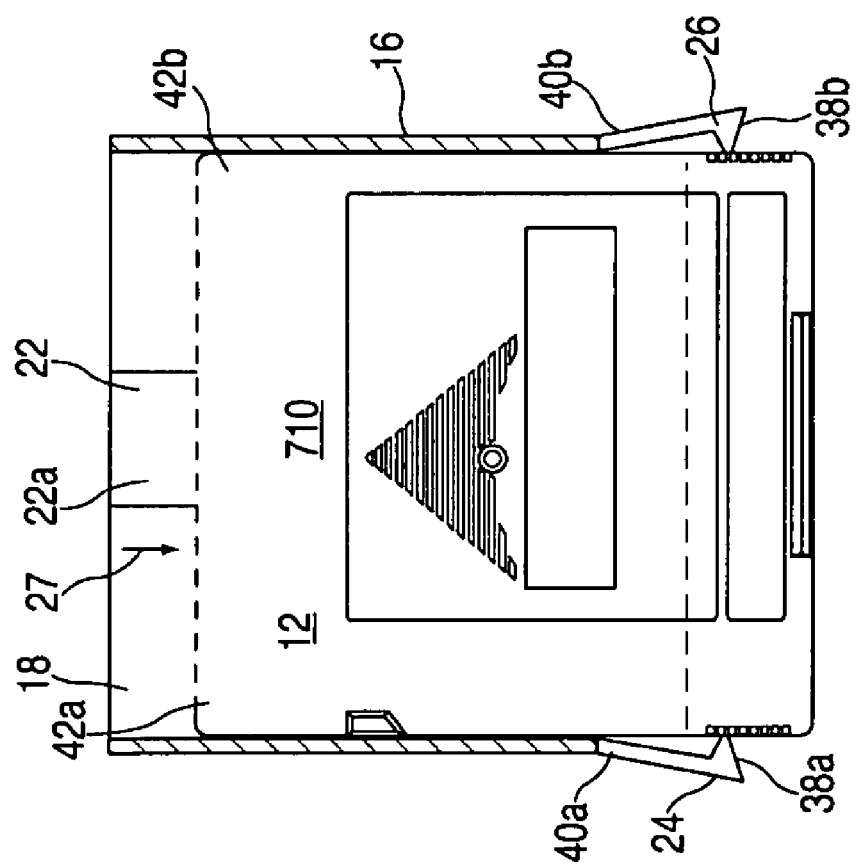
FIG. 6
FIG. 7

DEEP STORAGE SLOT WITH A CONSTANT SPRING FORCE

FIELD OF THE INVENTION

The disclosure relates generally to automated tape libraries, and more particularly to automated tape libraries capable of storing cartridges by depth within storage slots.

BACKGROUND OF THE INVENTION

In automated tape libraries there exist cartridge storage slots or cells for holding tape cartridges for retrieval by a cartridge accessor. One of the important customer requirements for tape libraries is to have a very high density of tape cartridges per unit floor area. A method of increasing cartridge density within the library is to include storage slots that are deep enough to hold multiple cartridges. Particularly, for smaller tape libraries, deep slots can be advantageous when geometry constraints limit the possible locations of tape cartridges within a small area. When deep storage slots are utilized, it is desired to have a method of pushing the cartridge to the front opening of a slot in order for the cartridge accessor to grab the cartridge.

One known method for moving tape cartridges to the front of a deep storage slot uses a robotic mechanism to push the cartridges from the back of the slots to the front of the slots. This robotic mechanism can add significant cost to a library, as well as require significant space, negatively affecting available storage density within the library. Another known method for moving tape cartridges to the front of a deep storage slot uses a compression spring to push cartridges forward. One drawback to this method is that the spring itself must be relatively long in order to push the complete length of one or more cartridges. This causes the stack height of the spring to be quite significant, and causes the overall storage density within the library to be negatively affected. Another problem with the long spring is that it is subject to buckling under its compression load. Still another drawback is that the push force presented by the spring increases as the spring is loaded. This variation in spring force (dependant on the number of cartridges in the storage slot) requires that the force necessary to retain the cartridge from falling out of the slot also be variable. This is difficult and costly to accomplish. A method for pushing the cartridges forward that does not sacrifice storage density and works reliably and cost effectively is desirable.

SUMMARY

Disclosed is a deep storage slot with a constant spring force comprising a storage slot housing defining a cartridge cavity and a cartridge opening, wherein the cartridge cavity is configured to store a plurality of cartridges in depth. Also disclosed is a constant force spring comprising a rolled, pre-stressed strip that exerts a constant force to resist uncoiling, the constant force spring having a first end affixed to the storage slot housing within the cartridge cavity to direct the constant force towards the cartridge opening, and at least one retention feature configured with the storage slot housing to hold at least one of the plurality of cartridges within the cartridge cavity against the constant force.

BRIEF DESCRIPTION OF THE FIGURES

The foregoing and other features and advantages of the present invention should be more fully understood from the following detailed description of illustrative embodiments taken in conjunction with the accompanying Figures in which like elements are numbered alike in the several Figures:

FIG. 2 is a side perspective of the deep storage slot with a constant spring force with a cutout to show the constant force spring being pushed via contact with a cartridge;

FIG. 3 is a side perspective of the deep storage slot with a constant spring force with a cutout to show the constant force spring being pushed via contact with the cartridge that is being contacted by another cartridge;

FIG. 4 is a side view of the constant force spring;

FIG. 5 is a side view of the constant force spring in a more uncoiled state;

FIG. 6 is top view of the deep storage slot with a constant spring force with a cutout to show a cartridge entering the deep storage slot;

FIG. 7 is top view of the deep storage slot with a constant spring force with a cutout to show a cartridge that has fully entering the deep storage slot.

DETAILED DESCRIPTION

Figure 1:
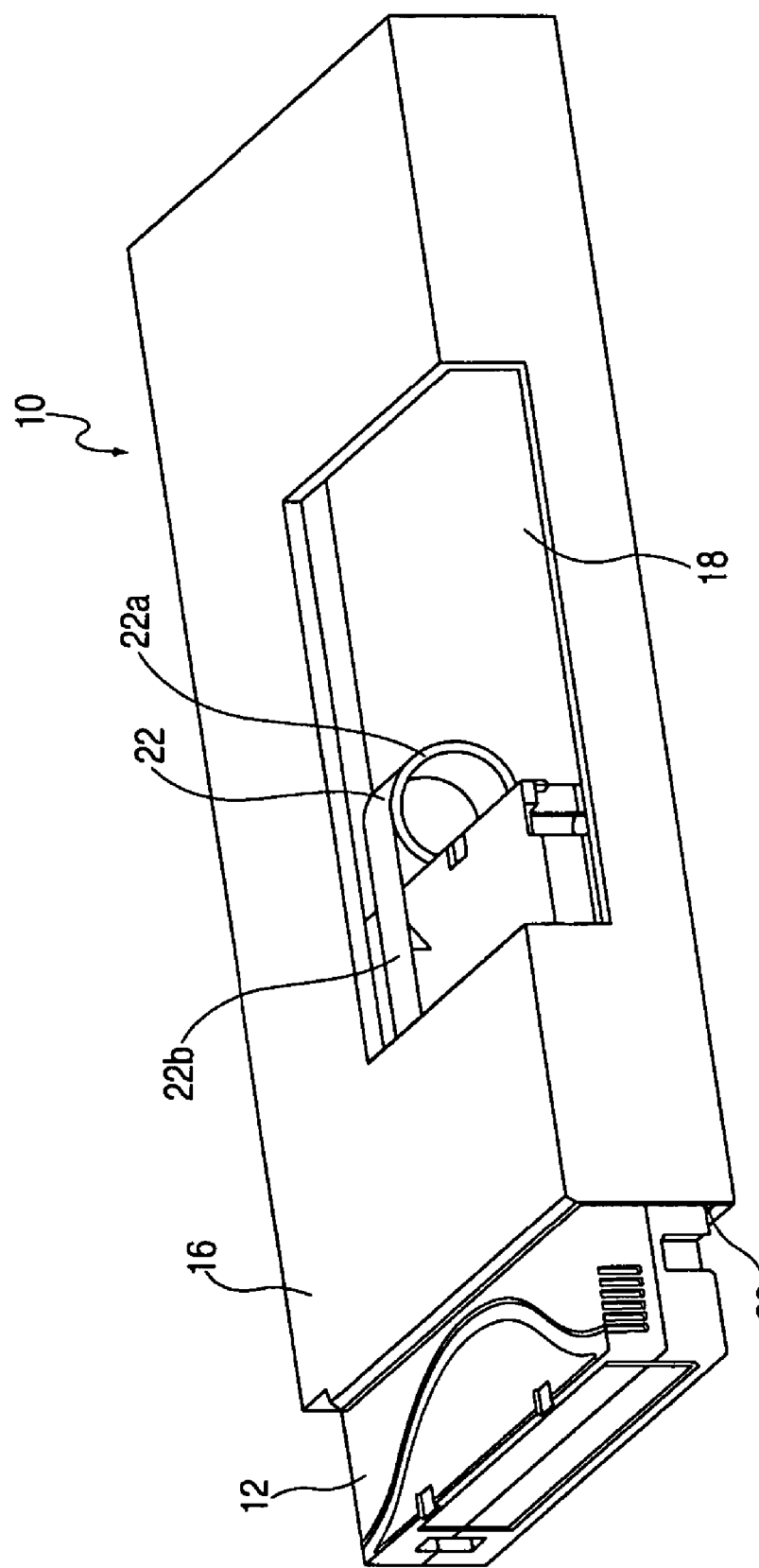
FIG. 1 is a side perspective of a deep storage slot with a constant spring force with a cutout to show a constant force spring.

Referring to FIGS. 1-3, a deep storage slot with a constant spring force 10 is illustrated, and will be referred to hereinafter as the deep storage slot 10 for simplicity purposes. The deep storage slot 10 is a component of an automated library (not illustrated) that stores a plurality of cartridges 12 and 14, wherein the cartridges 12 and 14 may be placed within and removed from the deep storage slot(s) 10 of the library by a cartridge accessor (not illustrated).

As is shown in FIGS. 1-3, the deep storage slot 10 includes a storage slot housing 16 that defines a cartridge cavity 18 and a cartridge opening 20. It is the cartridge cavity 18 that, as is referred to above, actually allows storage of the plurality of cartridges 12 and 14 within the deep storage slot 10. The cartridge cavity 18 is typically configured to store the plurality of cartridges 12 and 14 horizontally, as is shown in FIGS. 1-3. The deep storage slot also includes a constant force spring 22 and at least one retention feature 24-26.

Referring to FIGS. 4-5, the constant force spring 22 is a roll 22a of a pre-stressed strip 22b, such as steel, that exerts a constant force 27 to resist uncoiling or unrolling. In FIG. 4, the constant force spring 22 is shown with most of the strip 22b rolled or coiled to form the roll 22a. In FIG. 5, the roll 22a of the constant force spring 22 has been further uncoiled in response to an outside force 25 that pushes against and overcomes the constant force 27. When this constant force spring 22 is used in conjunction with the deep storage slot 10, referring back to FIGS. 2-3, an end 28 of the constant force spring 22 or strip 22b is affixed to the storage slot housing 16 at affixing point 32 (though it may affixed anywhere within the cartridge cavity 18, including within a recess on a relative bottom portion of the storage slot housing 16). This affixing point will likely be disposed at or in proximity to an opening end 30 of the storage slot housing 16, wherein an area of proximity is illustrated at opening end region 33 in the Figures. Affixing the end 28 of the constant force spring 22 allows the now anchored roll 22a a freedom to be unrolled deeper into the cartridge cavity 18 in response to an outside force entering the cartridge cavity 18. In an automated library, that outside force is a cartridge accessor (not illustrated)

pushing the cartridges 12 and 14 into the cartridge cavity 18 against the constant force 27, which, because of the manner in which the constant force spring 22 is disposed and affixed within the cartridge cavity 18, is directed towards the cartridge opening 20. An example of the roll 22a being unrolled deeper into the cartridge cavity 18 is illustrated by lengths 34a and 34b in FIGS. 2 (one cartridge 12) and 3 (two cartridges 12 and 14) respectively. The manner in which the cartridges 12 and 14 are inserted into and removed from the cartridge cavity 18 will be described in greater detail below.

As can be seen in FIGS. 1-3, the constant force spring 22 rolls up into a compact form, and has little effect on the amount of storage space that is available in the cartridge cavity 18 for cartridges 12 and 14. Additionally, the structure of the constant force spring 22 does not have the drawbacks of buckling, and the simplicity of the spring 22 allows it to be used on either large libraries or small libraries without adverse cost conditions. Furthermore, because of the inherent nature of the constant force spring 22, the constant force 27 exerted by the spring does not change (i.e. increase) as cartridges 12 and 14 are inserted into the cartridge cavity 18, and/or in response to spring 22 position within the cartridge cavity 18.

As was briefly introduced above, and referring specifically to FIGS. 6 and 7, the deep storage slot 10 also includes at least one retention feature 24-26. The retention features 24-26 retain cartridges 12 and 14 (14 not illustrated in FIGS. 6-7, but is shown in FIG. 2) within the cartridge cavity 18 when cartridge storage is desired. In other words, during storage, the retention features 24-26 keep the cartridges 12 and 14 from being ejected from the cartridge cavity 18 by the constant force 27 of the constant force spring 22. The retention features 24-26 are illustrated as retaining hooks in secure association with the storage slot housing 16, but could take the form of any other feature that retains the cartridges within the cartridge cavity 18 when storage is desirable, such as detents. The retaining hooks 24-26 are disposed at the cartridge opening 20 and include hooked portions 38a-b and spring portions 40a-b, wherein the spring portions 40a-b associate the retaining hooks 24-26 with the storage slot housing 16. When the spring portions 40a-b are in an unbiased position, the hook portions 38a-b extends partially across the cartridge opening 20. When the spring portions 40a-b are pushed back into a biased position, the hook portions 38a-b are clear of the cartridge opening 20.

Referring to FIGS. 1-7, the manner in which cartridges 12 and 14 are placed within and removed from the cartridge cavity 18 by the cartridge accessor (not illustrated) will now be described, starting with insertion of the cartridge 12. When the cartridge accessor inserts the cartridge 12 into the cartridge cavity 18 for storage, the hook portions 38a-b are pushed out of the way by front edges 42a-b of the cartridge 12 (FIG. 6). As the front edges 42a-b (and thus, front of the cartridge 12) enter the cartridge cavity 18 via the cartridge opening 20, the cartridge 12 contacts the roll 22a of the constant force spring 22, and as the cartridge accessor pushes the cartridge 12 deeper into the cartridge cavity 18, the roll 22a unrolls against the constant force 27. After the cartridge 12 is past the hook portions 38a-b and fully inserted into the cartridge cavity 18, the spring portions 40a-b cause the hook portions 38a-b to return to their unbiased position, with the cartridge 12 being prevented from falling out of the cartridge cavity 18 by the hook portions 38a-b. After cartridge 12 is inserted, the cartridge 14 can be inserted into the cartridge cavity 18 in the same manner as cartridge 12 was, with the cartridge 12 now being pushed by the cartridge 14 deeper into the cartridge cavity 18 against the constant force 27 of the constant force spring 22. At this point, the hook portions 38a-b of the retaining hooks 24-26 are retaining both of the cartridges 12 and 14 against the constant force 27 via contact with the cartridge 14. As many cartridges as the deep storage slot 10 is configured to store may be inserted into the cartridge cavity 18 and stored in this manner.

When the cartridges 12 and 14 are to be removed from a cartridge cavity 18, the front edge of the cartridge accessor (not illustrated) deflects the hook portions 38a-b out of the way and into their biased position (much the same way as the front edges 42a-b of the cartridges 12 and 14 would), allowing the cartridge accessor to grasp and remove the cartridges 14. As the cartridge accessor removes cartridge 14, the constant force 27 re-rolls the roll 22a of the constant force spring 22 (i.e. the roll 22a portion that was unrolled during insertion), and this force 27 pushes the roll 22a, and the cartridge 12 with which the roll 22a is contacting, toward the cartridge opening 20. When the cartridge 14 is fully removed, the hook portions 38a-b are free to spring back to their unbiased position, and retain the cartridge 12, which has now been pushed by the constant force spring 22 into contact with the hook portions 38a-b. Because the cartridge 12 has been pushed to the cartridge opening 20 and into contact with the retaining hooks 38a-b, the cartridge accessor now has the same access to the cartridge 12 as it did the cartridge 14. Without the pushing of the constant force spring 22, the cartridge 12 would be out of reach.

Figure 8:
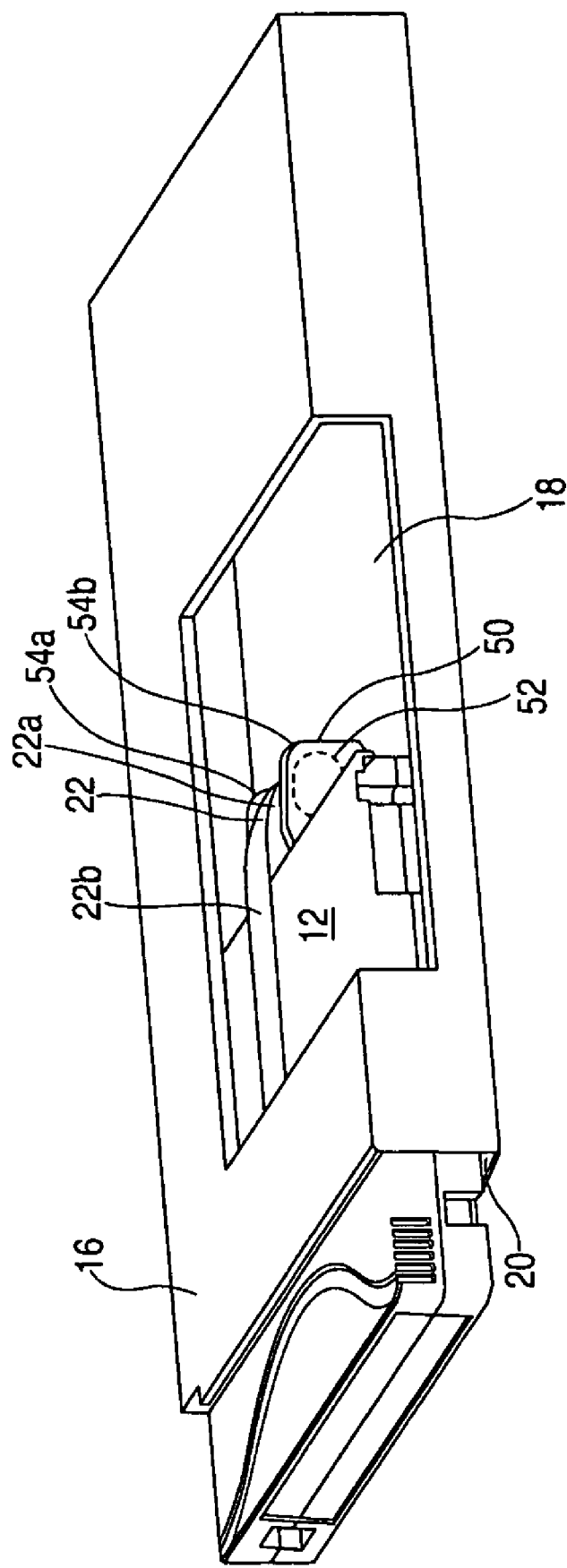
FIG. 8 is a side perspective of a deep storage slot with a constant spring force with a cutout to show a constant force spring and associated spring spool.

It should be appreciated that the constant force spring 22 is not expected to be perfectly constant, as the deep storage slot 10 will work despite some inconsistency in spring force. It should also be appreciated that the deep storage slot 10 may include a spring spool 50 in association with the constant force spring 22, as shown in FIG. 8. The spring spool 50 includes a middle portion 52 and outer portions 54a-b. The roll 22a may roll and unroll upon the middle portion 52 of the spring spool 50 as the roll 22a is moved within the cartridge cavity 18, while the outer portions 54a-b contact the cartridge 12. Thus, the roll 22a is free to rotate about the middle portion 52 of the spring spool 50, while the outer portions 54a-b of the spring spool 50, which do not rotate, contact and apply force to the cartridge 12. This eliminates any wear on the cartridge 12 that could be caused by contact and force application from a rotating feature, such as the roll 22a.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A deep storage slot with a constant spring force comprising:
   a storage slot housing defining a cartridge cavity and a cartridge opening, wherein said cartridge cavity is configured to store a plurality of cartridges in depth;
   a constant force spring comprising a rolled, pre-stressed strip that exerts a constant force to resist uncoiling, said constant force spring having a first end affixed to said storage slot housing within said cartridge cavity to direct said constant force towards said cartridge opening;

at least one retention feature configured with said storage slot housing to hold at least one of said plurality of cartridges within said cartridge cavity against said constant force;

a spring spool associated with said constant force spring, wherein said spring spool comprises a structure separate from said constant force spring and includes a middle portion and outer portions, wherein said outer portions include a greater diameter or height than said middle portion, wherein said outer portions are distinct from said inner portion, wherein said constant force spring is configured to roll and unroll around said middle portion of said spring spool as said constant force spring moves within said cartridge cavity, wherein said outer portions are disposed in contact with at least one of said cartridges and said inner portion is disposed out of contact with said cartridges, wherein the constant force spring is rotateable about said middle portion while said outer portions remain in a non-rotating condition and contact at least one of said cartridges.

2. The deep storage slot with a constant spring force of claim 1 wherein said end of said constant force spring is affixed to said storage slot housing within said cartridge cavity at an opening end of said storage slot housing.

3. The deep storage slot with a constant spring force of claim 1, wherein said cartridge cavity is configured to store said plurality of cartridges in a horizontal position.

4. The deep storage slot with a constant spring force of claim 1, wherein said at least one retention feature is a retaining hook in secure association with said housing, disposed at an opening end of said storage slot housing.

* * * * *